United States Patent [19]
Baldur

[11] Patent Number: 6,018,394
[45] Date of Patent: Jan. 25, 2000

[54] APPARATUS AND METHOD FOR IMAGING FIRED AMMUNITION

[75] Inventor: Roman Baldur, Waterloo, Canada

[73] Assignee: Forensic Technologies Wai Inc., Montreal, Canada

[21] Appl. No.: 09/061,325

[22] Filed: Apr. 17, 1998

[51] Int. Cl.$^7$ .................................................... G01B 11/00
[52] U.S. Cl. ........................... 356/388; 356/394; 359/387
[58] Field of Search .................................... 356/388, 391, 356/394, 375; 359/385, 387, 391, 392, 373, 374; 348/79

[56] References Cited

U.S. PATENT DOCUMENTS

| | | |
|---|---|---|
| 3,780,614 | 12/1973 | Maier . |
| 5,379,106 | 1/1995 | Baldur . |
| 5,654,801 | 8/1997 | Baldur . |
| 5,857,202 | 1/1999 | Demoly et al. .......................... 356/388 |

*Primary Examiner*—Frank G. Font
*Assistant Examiner*—Roy M. Punnoose
*Attorney, Agent, or Firm*—Swabey Ogilvy Renault

[57] ABSTRACT

An apparatus and method for imaging fired bullets and/or cartridges for forensic examination, which facilitate mounting of the ammunition to be imaged. The apparatus comprises a mounting support including a fired bullet holding device and a fired cartridge holding device, a microscope, an illumination device and a mechanical device for selectively aligning the optical axis of the microscope with a bullet section or the longitudinal axis of the cartridge showing its head surface. The bullet holding device comprises a rotary member extending through a mounting support and ending with an adjustable bullet holder for maintaining the bullet in a desired angular orientation with respect to a transverse reference plane aligned with the optical axis of the microscope, while the rotary member is being rotated about its rotation axis to scan the imaged surface area. According to a preferred embodiment, the adjustable bullet holder includes a bullet mounting ball for attaching thereto the bullet and being received in a socket portion of the rotary member, and a retaining device for maintaining the mounting ball and the attached bullet in the desired angular orientation. The retaining device preferably comprises a magnetic source using ferromagnetic properties of the mounting ball to provide retaining thereof, while providing mechanical coupling for imparting rotation to the rotary member as desired. The apparatus and method according to the invention are particularly useful in connection with an automated ammunition examining system.

33 Claims, 3 Drawing Sheets

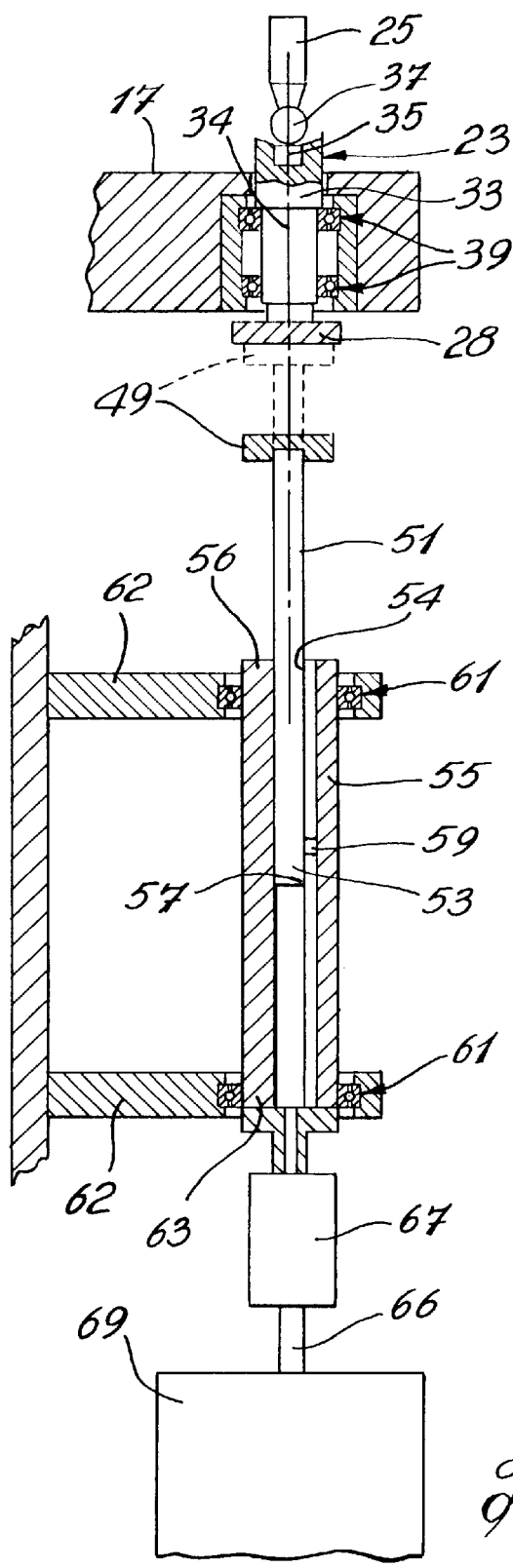
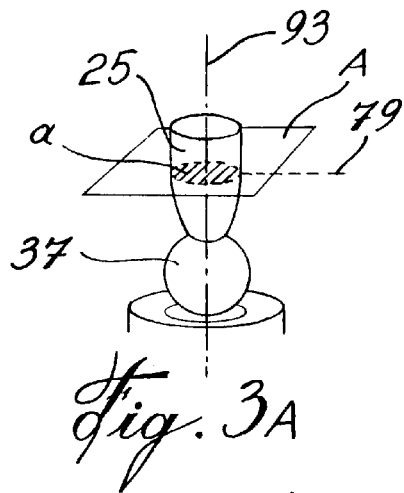
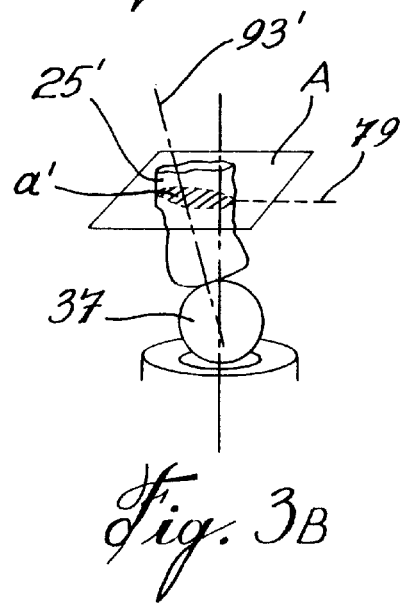
Fig. 2
Fig. 3A
Fig. 3B

APPARATUS AND METHOD FOR IMAGING FIRED AMMUNITION

FIELD OF THE INVENTION

The present invention relates to a fired ammunition imaging apparatus for use during forensic examination of spent firearm ammunition, and more specifically to a fired bullet and cartridge mounting device for use in a fired ammunition imaging apparatus. The invention relates further to a method for mounting a fired bullet to be imaged using the mounting device of the present invention.

BACKGROUND OF THE INVENTION

Forensic firearm examiners have to match fired bullets and cartridges under analysis with bullets and cartridges known to be fired by specific weapons. For so doing, examiners search for similarities between ammunition and weapons suspected to have been employed in the firing. According to the usual manual process, two bullets or two cartridges are placed under a comparison microscope, and the bullets or cartridges are viewed at the same time by the examiner who compares the characteristics of their outer surfaces to determine if there is a match between them. As the reason for determining whether there is or is not a match is to present evidence in legal proceeding, the final step in the determination is normally performed by a human being who can subsequently appear as a witness in the legal proceeding. Nevertheless, the burden of examiner could be greatly alleviated by an automated system for providing degree of match between pairs of bullets or cartridges. Such an automated system is disclosed in U.S. Pat. No. 5,379,106 issued on Jan. 3, 1995 to the Applicant, which system comprises a microscope aligned with a bullet to be examined and being coupled to a video camera sending image electrical signals to an image digitizer to produce a digital representation of the bullet outer surface. The coded digital representations of the bullet can then be computer compared to the coded digital representation of another bullet to determine if there is a match between the bullets. The system comprises a bullet carrier provided with a rotating rod coupled to a motor and a support rod, each having and inner end affixed to a respective end of the bullet to provide support and rotation thereof. For the purposes of forensic examination, there is generally required to accurately adjust the position of the bullet mounted on the carrier. Although such positioning can be assisted by monitoring apparatus as taught in the U.S. 5,379,106 patent, which uses a pair of light sources directing planar light beams at angle on the outer surface of the bullet under observation for providing indication of the position of the bullet as held on the carrier, manipulation of the bullet by the examiner to obtain a desired position may delay the examining task, especially when a plurality of bullets have to be analyzed.

Another prior art bullet mounting device is disclosed in U.S. Pat. No. 3,780,614 issued on Feb. 5, 1973 to Maier, which mounting device comprises a plurality of bullet holders rotatably connected to a rotatable carrier, and a manually retractable shaft provided with an end blade adapted to engage a selected bullet holder while allowing rotation thereof about its longitudinal axis, to index the carrier and to releasably hold the carrier in position. Although such multiple mounting device can handle a plurality of bullets to perform a corresponding series of inspection routines, manipulation of each bullet by the examiner to obtain a particular position may be still difficult and time-consuming, especially where the bullet under inspection is damaged or where both bullets and cartridges have to be successively examined.

In U.S. Pat. No. 5,654,801 issued on Aug. 5, 1997 to the Applicant, there is disclosed an automated fired ammunition imaging apparatus provided with bullet and cartridge mounting devices and associated microscope and camera assemblies.

In International application NO. WO 97/21128 published on Jun. 12, 1997 and naming the Applicant as Assignee, there is disclosed a portable apparatus for imaging fired cartridges.

There is still a need for a compact fired ammunition imaging apparatus providing improved manipulation features.

SUMMARY OF THE INVENTION

It is therefore an object of the present invention to facilitate and therefore to improve the process of fired ammunition imaging.

It is another object of the present invention to provide a compact imaging apparatus for fired ammunition imaging.

According to the above objects, from a broad aspect of the present invention, there is provided a fired bullet mounting device for use in a fired ammunition imaging comprising a microscope having an optical axis, means for aligning the optical axis with a bullet section defined by a transverse reference plane intersecting the bullet, means for focusing said microscope to image a surface area of said bullet, and illumination means mounted to project light onto the imaged surface area. The mounting device comprises rotary support means having a rotation axis and being mounted with said rotation axis being substantially perpendicular to the transverse reference plane. The device further comprises adjustable bullet holder means supported by the rotary support means, for holding the bullet in a desired angular orientation with respect to the transverse reference plane while the rotary support means are being rotated about the rotation axis to scan the imaged surface area.

Conveniently, the adjustable bullet holder means comprise a mounting ball, means for attaching the bullet to a surface area of the mounting ball, socket means for receiving the mounting ball at a portion thereof generally opposed to the surface area and means to substantially lock the mounting ball in the desired angular orientation., said attaching means being adhesive means.

According to a further broad aspect of the present invention, there is provided a fired ammunition imaging apparatus. The apparatus comprises ammunition mounting device including means for holding a fired bullet in a position where the fired bullet intersects a transverse reference plane defining bullet section and means for holding a fired cartridge having a longitudinal axis, a head surface of the cartridge being substantially perpendicular to the longitudinal axis. The apparatus further comprises a microscope having an optical axis, means for selectively aligning the optical axis with one of said bullet section and longitudinal axis of said cartridge, means for selectively focusing the microscope to image a surface area of the selected one of said bullet and said head cartridge surface and illumination means mounted to project light onto the imaged surface area.

According to a still further broad aspect of the present invention, there is provided a method for mounting a fired bullet to be imaged, comprising steps of: a) attaching said fired bullet to a an exposed surface area of a mounting ball; b) providing a socket means for receiving the mounting ball at a portion thereof generally opposed to the surface area; c) placing the bullet in a desired angular orientation with respect to an intersecting transverse reference plane defining a bullet section; d) providing a microscope having an optical axis; e) aligning the optical axis with the bullet section; f) projecting light on a surface area of the bullet; and g) focusing the microscope to image said surface area.

Preferably, the method further comprises step of h) rotating the fired bullet about a rotation axis substantially perpendicular to the transverse reference plane, the bullet section being intersected by the rotation axis, to scan the imaged bullet surface area.

Other advantages of the present invention consist of providing a user friendly imaging apparatus and method which facilitate the mounting of bullets and/or cartridges for image acquisition, which demand very limited knowledge of the firearms discipline to operate, thereby producing more consistent results and accelerating the process of image acquisition.

BRIEF DESCRIPTION OF THE DRAWINGS

The invention will be better understood by way of the following detailed description of preferred embodiments with reference to the appended drawings, in which:

FIG. 2 is a partial cross-sectional front view of the apparatus of FIG. 1 along lines 2—2, showing a bullet mounted on the device;

FIG. 3A is a perspective view of a pristine fired bullet attached to the mounting ball provided on the apparatus shown in FIG. 1, which bullet has its longitudinal axis substantially perpendicular to a transverse reference plane A and aligned with the rotation axis of the rotary member supporting the mounting ball;

FIG. 3B is a perspective view of a damaged fired bullet attached to the mounting ball and having a desired generally inclined orientation relative to the transverse reference plane A.

DETAILED DESCRIPTION OF THE PREFERRED EMBODIMENT

Figure 1:
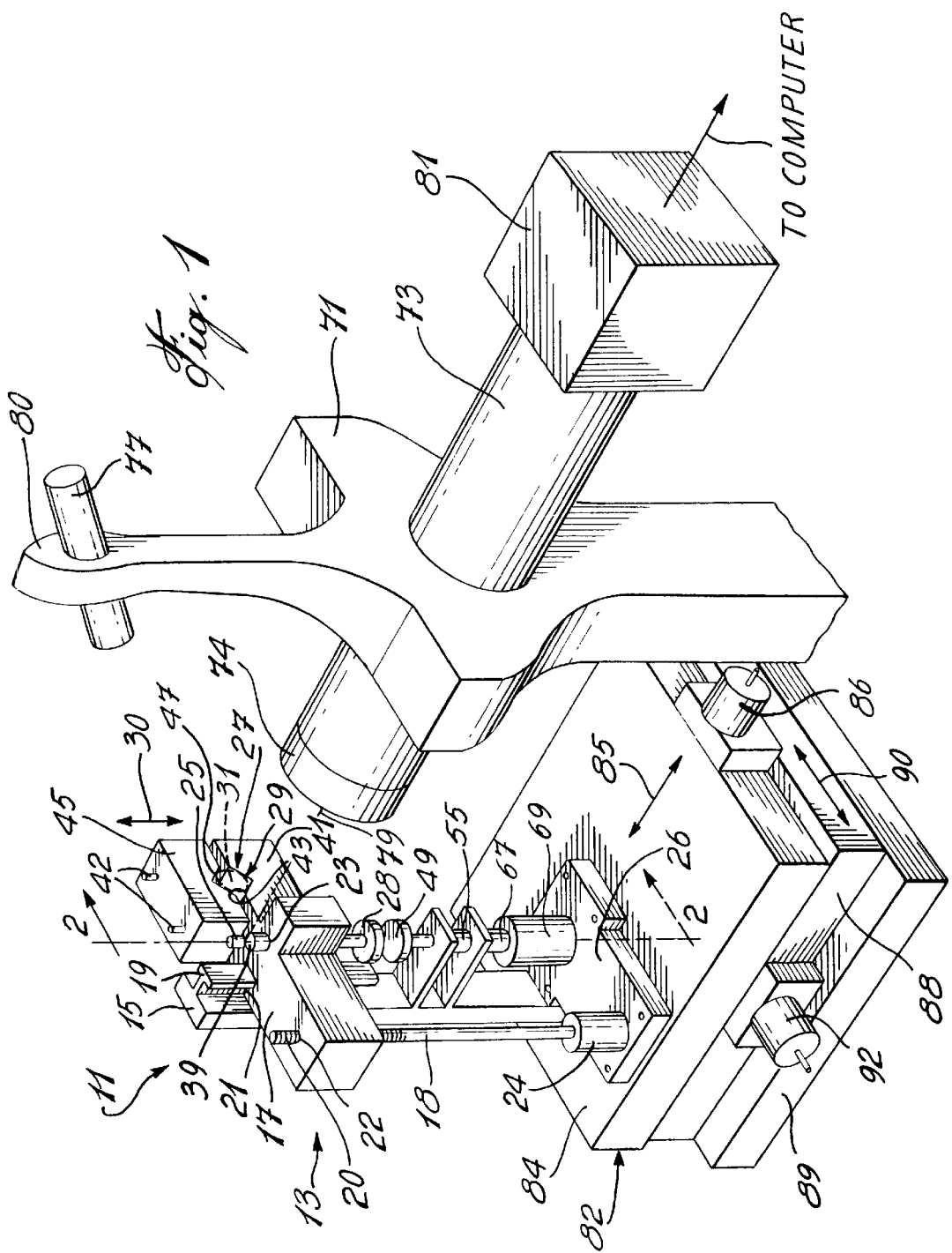
FIG. 1 is a perspective view of the apparatus and mounting device according to a first preferred embodiment of the present invention.

Referring now to FIG. 1, there is shown an ammunition imaging apparatus generally designated at 11 which is used as an image acquisition station for capturing images of the surfaces of bullets and cartridges needed for automated firearms identification. The apparatus 11 comprises an ammunition mounting device generally designated at 13 including a frame 15 and an ammunition mounting support 17 slidably mounted on an upper portion of the frame 15 provided with a T-profile guide rail 19 cooperating with a corresponding channel 21 extending through a rear edge of the mounting support 17. Motion of the mounting support 17 in the direction indicated by double-arrow 30 is provided through a linear actuator assembly comprising a driving shaft 18 having a first threaded end portion 20 passing through a corresponding threaded bore 22 extending through the mounting support 17. A second end of the shaft 18 is rigidly secured to the output shaft of a first rotary actuator 24 mounted on a base portion 26 of the frame 15 for controlling the position of the mounting block 17 relative to the frame 15. The mounting support 17 further comprises an adjustable bullet holder 23 for receiving a fired bullet 25 the outer surface of which has to be imaged, and a cartridge holder 27 for retaining a fired cartridge 29 having a head surface 31 to be imaged. Turning now to FIG. 2, according to a first preferred embodiment, the bullet holder 23 has a rotary member 33 made of a ferromagnetic material and shaped as a tube at a top end 35 thereof to form a socket portion for receiving a bullet mounting ball 37, and is fitted with a coupling disk 28 made of a ferromagnetic material at an other end thereof. The diameter of the ball 37 is chosen slightly greater than that of the inside radial dimension of the tube shaped top end 35. The rotary member 33 is mounted on the mounting support 17 for free rotation about its longitudinal axis through a pair of thrust and guide bearing assemblies 39. The bullet 25 is attached to the mounting ball 37 through a suitable adhesive, for holding the bullet 25 in a desired imaging position, as it will be later explained in more detail. The bullet can also be attached through an adhesive material partially covering the mounting ball at its exposed surface, which material could be re-used several times. Alternately, the bullet may be attached through the use of small suction cups of a suitable design. The bullet mounting ball 37 is made of ferromagnetic material, for a purpose that will be explained later in more detail. To limit weight of the mounting ball 37, the ferromagnetic material preferably contains ferromagnetic particles, such as iron particles, embedded in a non-ferromagnetic matrix, such as plastic resin.

Returning to FIG. 1, the fired cartridge holder 27 is in the form of a clamp comprising a fixed member 41 provided with a first longitudinal V-groove 43 cut for complying with a wide range of cartridge sizes, and a spring loaded displaceable member 45 slidably connected to the fixed member 41 through guiding rods 42. The displaceable member 45 is provided with a second longitudinal V-groove 47 matching the first V-groove 43 for retaining therebetween the cartridge 29 to be imaged, preferably in an horizontal position to facilitate cartridge manipulation. Alternately, a sleeve (not shown) for containing the cartridge and mounted on the holder 27 for rotation about the longitudinal axis of the cartridge can be used for providing adjustment of the head surface orientation. As better seen in FIG. 2, the ammunition mounting device 13 further comprises a driving unit including a clutching disk 49 made of a permanently magnetized material secured to a free end of a sliding rod or shaft 51 having another end portion 53 being slidingly mounted in a longitudinal bore 54 of a sleeve 55 provided with a means for preventing rotation of the shaft 51 relative to the sleeve, in the form of a longitudinal narrow groove 57 receiving a cooperating pin or surface outwardly protruding from the outer cylindrical surface of the shaft end portion 53. Alternately, a shaft showing a polygonal section cooperating with a sleeve having a corresponding polygonal bore can be used. The inner diameter of the bore 54 is chosen greater than the outer diameter of the shaft 51, but sufficiently close thereto for providing tight sliding engagement of the shaft within the sleeve bore 54, in a such a manner than the shaft can only be displaced when an external force is applied thereto by the operator for positioning the clutching disk 49 relative to a proximal end 56 of the sleeve 55, as it will be explained later in more detail. Alternately, a set screw extending through the sleeve may be used to lock the shaft 51 in a desired position. It is to be understood that any linear guide bearing of any suitable design could be used. The sleeve 55 is in turn mounted on a pair of opposed holding plates 62 welded or otherwise secured to the frame 15, for rotation about its longitudinal axis through a pair of thrust and guide bearing assemblies 61. The distal end 63 of the sleeve 55 is connected to the driven portion 65 of a flexible coupling element 67 to the driving shaft 66 of a second rotary actuator 69 for controlling rotation of the sleeve 55 and shaft 51. It is pointed out that in the example shown, it has been avoided to place the rotary actuators 24 and 69 on the mounting support 17 subjected to vertical motion, to minimize adverse gravity effect which could have otherwise affected accuracy of the lifting motion of the mounting support 17 during operation.

Returning to FIG. 1, the apparatus 11 further comprises an optical components support 71 for holding an examining microscope 73 of a known construction, which is preferably an adjustable zoom microscope. Axially symmetrical light is provided by a fiber optic ring light 74 of a known construction. In the case of cartridge examination, axi-symmetrical illumination renders the imaging insensitive to cartridge orientation. In the case of bullet examination, it provides background light that makes some of the surface markings more clearly visible. Alternately or concurrently, an external point source of light can be directed to the examined ammunition component through the microscope objective, as well known in the art. It is to be understood that other illumination techniques that may be suitable for particular purposes, such as oblique illumination for examination of the primer surface edge of fired cartridge, can be used. Magnified image of the examined bullet 25 or cartridge 29 is captured by an electronic camera 81 coupled to the microscope 73 for generating corresponding electrical image signals. The camera 81 is particularly useful when the apparatus 11 is used as an image acquisition station in connection with a computer system (not shown) for automated image analysis, such as those disclosed in U.S. Pat. No. 5,379,106 and U.S. Pat. No. 5,659,489 issued to the Applicant, the disclosures of which are incorporated herein by reference. Alternately, the magnified image can be directly viewed though the ocular of the microscope 73. The apparatus 11 can further be provided with focus measuring means such as laser ranging device 77 mounted on an extension 80 of the support 71 and being directed toward an examining area intersected by an optical axis 79 of the microscope 73, preferably extending in an horizontal plane. The laser ranging device 77 can further be used to measure the shape of the ammunition under examination. Where a computerized analyzing system is used, operation of the laser device 77 can be software controlled. The apparatus 11 is further provided with a positioning X-Y table 82 including a first stage 84 on which the frame base portion 26 is mounted, the first stage 84 being displaceable in both directions indicated by double-arrow 85, which are generally parallel to the optical axis 79 and within a basic reference plane parallel to the transverse reference plane intersecting the bullet 25. The table 82 further comprises a first linear actuator 86 for providing displacement of the first stage 84. The first stage 84 combined with the linear actuator 86 are used as focusing means for the microscope 73, by adjusting the distance separating the mounting support 17 and the objective of the microscope 73. The table 82 further comprises a second stage 88 mounted on a base plate 89 for supporting the first stage 84, the second stage 88 being displaceable in both directions indicated by double-arrow 90, which are normal to the optical axis 79 and parallel to the basic reference plane, and therefore normal to the directions of double-arrow 85. The table 82 also comprises a second linear actuator 92 for providing displacement of the second stage 88. The second stage 88 and the guide rail 19 cooperating with the channel 21 form optical axis aligning means for displacing the mounting support 17 in directions respectively normal to the optical axis 79 and normal to the basic reference plane. The laser ranging device 77 provides control of the linear actuator according to the detected focus of the imaged portion of the bullet 25 or cartridge 29. It is to be understood that according to a variant, second stage 88 could be designed to provide movement parallel to the optical axis 79 while first stage 84 being displaceable in a direction normal thereto.

Referring now to FIGS. 1, 2, 3A and 3B, operation of the apparatus according to the first preferred embodiment will be now explained. For bullet inspection, the operator attaches the fired bullet 25 to the exposed surface of the mounting ball 37. Preferably, this operation is performed prior to placing the mounting ball 37 on the tube-shaped top end 35 of the rotary member. The operator generally aligns the microscope optical axis with the bullet outer surface portion to be imaged by adjusting positions of the mounting support 17, first stage 84 and second stage 88 accordingly. Referring to FIG. 3A, the pristine bullet 25 is mounted so that its longitudinal axis 93 is generally aligned with the rotation axis 34 of the rotary member 33 shown in FIG. 2. It can be seen in FIG. 3A that the optical axis 79 is generally aligned with a bullet section a defined by the intersection of the bullet 25 with a transverse reference plane A. In the example shown, the transverse reference plane A is chosen substantially horizontal and the rotary axis substantially cvertical, to minimize adverse effect of gravity on the bullet 25. However, it is to be understood that other proper mounting orientations may be chosen. For damaged bullet examination, as shown in FIG. 3B, the operator choose the angular orientation of a damaged bullet 25' so that the outer surface to be imaged, which is aligned with the bullet section a', is approximately perpendicular to the optical axis 79 of the microscope, thereby indicating the region of interest by translation or rotation between appropriate limits. To retain the bullet in the desired position relative to the transverse reference plane A, to withstand rotation of the rotary member for imaged surface area scanning, the shaft is being previously displaced to a position shown in truncated lines in FIG. 2, where the magnetic clutching disk 49 contacts the coupling disk 28, applying a magnetic force to the mounting ball 37 at a first magnitude sufficient to maintain thereof in frictional rigid engagement with the tube-shaped top 35 of the rotary member 33. Friction force created between the clutching disk 49 and the coupling disk 28 is sufficient to provide torque transfer required to impart rotation to the rotary member 33 upon operation of the rotary actuator 69. In order to facilitate the manipulation required to attain the desired bullet orientation with respect to the transverse reference plane A, the operator can raise the shaft 51 so that the magnetic clutching disk 49 is in close proximity to the coupling disk 28 of the rotary member 33. This creates a weak magnetic field of a second magnitude adding a certain amount of frictional rigidity to the contact between the mounting ball 37 and the tube-shaped top end 35 of the rotary member 33, while allowing positioning of the bullet in the desired orientation prior to locking for rotary member rotation. Due to friction applied to the thrust and bearing assembly 39, the magnetic force may reduce the tendency for the rotary member to rotate, thereby further facilitating the manipulation. However, the magnetic field generated is neither sufficient to permanently magnetize the coupling disk 28 or rotary member 33, nor to permanently magnetize the mounting ball in any adverse extent. Alternatively, the ferromagnetic bullet mounting ball 37 may be located on a tubular socket of non-magnetic material and a permanent magnet located below the latter, in close proximity to the mounting ball. The distance between the ball and the permanent magnet may be adjustable so as to achieve different levels of retention of the bullet mounted on the ball. The retentive magnetic force could be made suitable for the adjustment of the bullet orientation, or for maintenance of the bullet position during rotation and displacement associated with image taking. When the bullet 25 is rigidly mounted, the focus can be adjusted through displacement of the first stage 84 upon activation of the linear actuator 86 which could be controlled by the ranging laser 77. If the apparatus 11 is used in connection with a computerized ammunition analyzing system, an automated process can be used to capture the complete circumference of a pristine bullet 25 as shown in FIG. 3A, or a pre-defined region of a damaged bullet 25' shown in FIG. 3B.

Turning now to FIG. 1, whenever a fired cartridge 29 is to be examined, the operator place the cartridge 29 between the V-grooves 43 and 47 respectively of the fixed member 41 and displaceable member 45 of the cartridge holder 27. The operator then selects the regions of interest by adjusting positions of the mounting support 17, first stage 84 and second stage 88 accordingly. If the apparatus 11 is used in connection with a computerized ammunition analyzing system, an automated process can be used to select regions of interest by computer software. In either case, all the parameters of the image capture can be adjusted automatically and all required image be taken.

Figure 4:
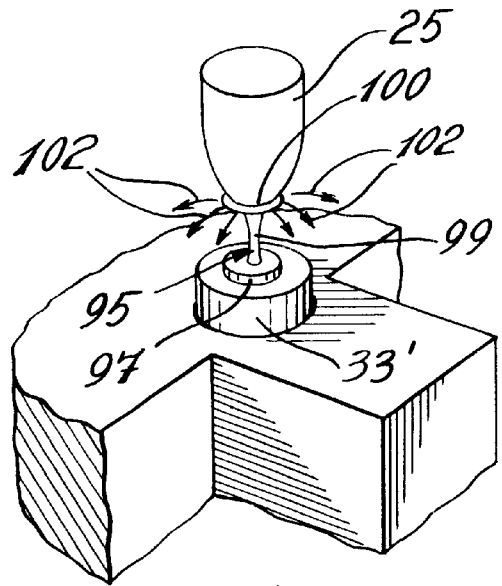
FIG. 4 is a perspective view of a bullet mounting rod provided on an apparatus according to a second embodiment of the present invention.

Turning now to FIG. 4, a bullet holder according to a second embodiment of the present invention will be now described. A mounting rod 95 have a base portion 97 provided with a threaded rod rigidly secured to top end of rotary member 33, an extended portion 99, and a cup-shaped end 100 for receiving the nose of a bullet 25. The end 100 may act as a suction cup to retain the bullet 25 thereon, otherwise any suitable adhesive can be used. The extended portion 99 is made of a malleable material, such as tin or copper alloys, to provided adjustment of the bullet angular orientation with respect to the transverse reference plane A, as described before with reference to FIGS. 3a and 3b, through inclination of the extended portion 99 toward any desired direction as shown by arrows 102.

Figure 5:
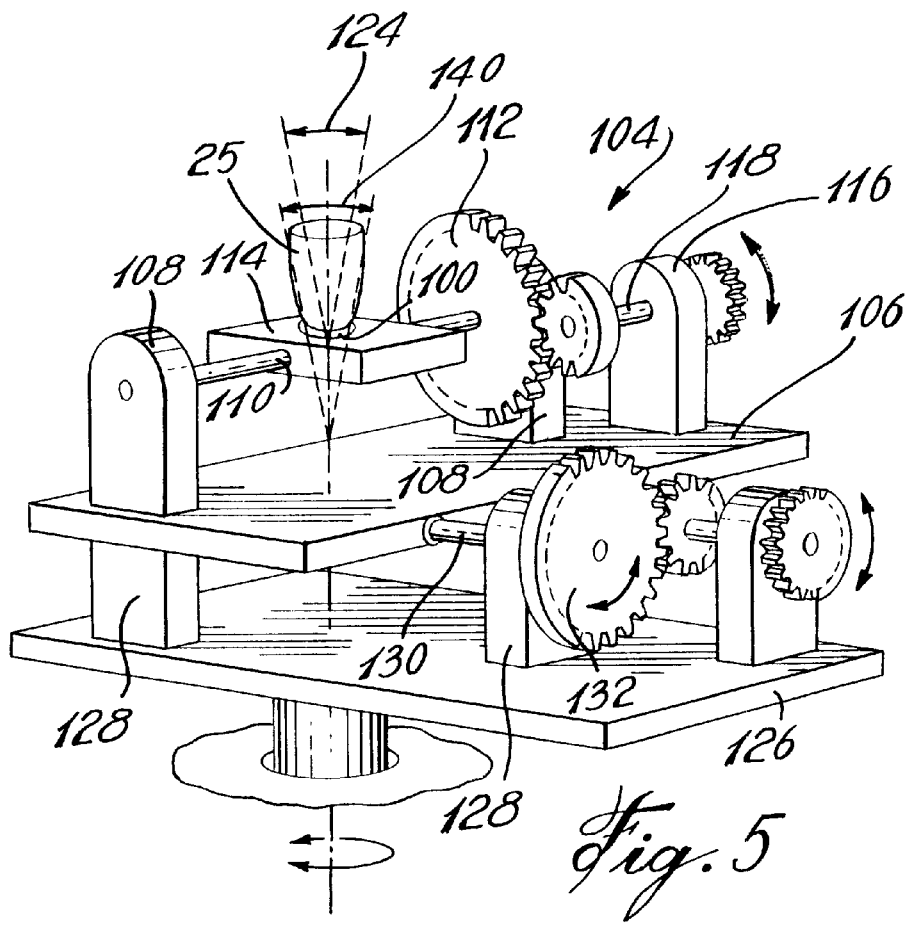
FIG. 5 is a perspective view of a bullet mounting mechanism provided on an apparatus according to a third embodiment of the present invention.

Turning now to FIG. 5, a bullet holder according to a third embodiment of the present invention will be now described. In this embodiment, the bullet holder is in the form of a mounting mechanism generally designated at 104, which comprises a first gearing stage 106 provided with a pair of bored holders 106 receiving a first rotating axle 110 having a driven end rigidly secured to a first large gear 112. Rigidly secured to the first axle 114 is a bullet mounting plate 114 provided with a cup-shaped portion 116 for receiving the nose of a bullet 25, as explained before with reference to FIG. 4. The first gearing stage 106 is further provided with a third bored holder 116 through which a second axle 118 extends, which axle is provided with a first adjustment wheel 122 at a first end thereof and with a small gear 120 cooperating with the gear 112 at an opposed end thereof. Ratio between gears 112 and 120 is chosen to provided fine adjustment of the angular orientation of the bullet 25 in a first plane as indicated by double-arrow 124 through rotation of axle 110 about its longitudinal axis. The mounting mechanism 104 further comprises a second gearing stage 126 provided with a pair of bored holders 128 receiving a third rotating axle 130 having a driven end rigidly secured to a second large gear 132. The second gearing stage 126 is further provided with a third bored holder 134 through which a fourth axle 118 extends, which axle is provided with a second adjustment wheel 136 at a first end thereof and with a small gear 138 cooperating with the large gear 132 at an opposed end thereof. Ratio between gears 132 and 138 is chosen to provided fine adjustment of the angular orientation of the bullet 25 in a second plane normal to the first plane, as indicated by double-arrow 140 through rotation of axle 130 about its longitudinal axis.

It is to be understood that any obvious modification of the embodiment described in the present specification is part of the present invention, provided it falls within the scope of the appended claims.

What is claimed is:

1. A fired bullet mounting device for use in a fired ammunition imaging apparatus comprising a microscope having an optical axis, means for aligning said optical axis with a bullet section defined by a transverse reference plane intersecting said bullet, means for focusing said microscope to image a surface area of said bullet, and illumination means mounted to project light onto said imaged surface area, said mounting device comprising:

rotary support means having a rotation axis and being mounted with said rotation axis being substantially perpendicular to the transverse reference plane; and adjustable bullet holder means supported by the rotary support means, for holding the bullet in a desired angular orientation with respect to the transverse reference plane while the rotary support means are being rotated about the rotation axis to scan the imaged surface area.

2. The device as claimed in claim 1, wherein said adjustable bullet holder means comprise:

a mounting ball;

means for attaching said bullet to a surface area of the mounting ball;

socket means for receiving the mounting ball at a portion thereof generally opposed to said surface area; and means to substantially retain the mounting ball in said desired angular orientation.

3. The apparatus as claimed in claim 2, wherein said attaching means is an adhesive means.

4. The apparatus as claimed in claim 2, wherein said mounting ball contains ferromagnetic material, said retaining means comprising means for applying a magnetic force to said ball at a first magnitude sufficient to maintain thereof in frictional substantially rigid engagement with said socket means with said bullet in said desired orientation while said support means is being rotated.

5. The apparatus as claimed in claim 4, wherein said transverse reference plane and said longitudinal axis are substantially horizontal.

6. The apparatus as claimed in claim 4, wherein said ferromagnetic material contains ferromagnetic particles embedded in a non-ferromagnetic matrix.

7. The apparatus as claimed in claim 6, wherein said magnetic force applying means can be operated to apply to said ball a magnetic force of a second magnitude lower than said first magnitude, said force being sufficient to maintain the ball in frictional engagement with said socket means while allowing positioning of said bullet in said desired orientation prior to said support rotation.

8. The apparatus as claimed in claim 7, wherein said magnetic force applying means is a magnetic field source aligned with said rotation axis and being mounted for displacement along said rotation axis between a proximal position and a distal position with respect to said mounting ball, to produce said magnetic forces of said first and second magnitudes respectively.

9. The apparatus as claimed in claim 8, wherein said rotary support means is a generally cylindrical member having a proximal end portion connected to said socket means, and a distal end portion made of a ferromagnetic material, said magnetic field source being mounted with a housing and driving shaft assembly having means to prevent rotation of said driving shaft within said housing, said driving shaft being displaceable within said housing along said rotation axis and being rigidly connected to said magnetic field source, said magnetic field source being used as a clutching device for mechanically coupling the distal end portion of said cylindrical member with said driving shaft.

10. The apparatus as claimed in claim 8, wherein said fired bullet holding means further comprise motor means coupled to said housing, said motor means being controlled to impart rotation to said cylindrical member.

11. A fired ammunition imaging apparatus comprising:
ammunition mounting device including means for holding a fired bullet in a position where said fired bullet intersects a transverse reference plane defining a bullet section and means for holding a fired cartridge having a longitudinal axis, a head surface of the cartridge being substantially perpendicular to the longitudinal axis;
a microscope having an optical axis;
means for selectively aligning the optical axis with one of said bullet section and longitudinal axis of said cartridge;
means for selectively focusing the microscope to image a surface area of the selected one of said bullet and said head cartridge surface; and
illumination means mounted to project light onto the imaged surface area.

12. The apparatus as claimed in claim 11, wherein said microscope is disposed in a such manner to present said optical axis substantially horizontal.

13. The apparatus as claimed in claim 11, wherein said fired bullet holding means comprise:
rotary support means having a rotation axis and being mounted on said frame with the rotation axis being substantially perpendicular to said transverse reference plane; and
adjustable bullet holder means supported by the rotary support means, for holding the bullet in a desired angular orientation with respect to said transverse reference plane while the rotary support means are being rotated about the rotation axis to scan the imaged surface area.

14. The apparatus as claimed in claim 13, wherein said adjustable bullet holder means comprise:
a bullet mounting ball;
means for attaching said bullet to a surface area of the mounting ball;
socket means for receiving the mounting ball at a portion thereof generally opposed to said surface area; and
means to substantially retain the mounting ball according to said desired angular orientation.

15. The apparatus as claimed in claim 14, wherein said attaching means use an adhesive.

16. The apparatus as claimed in claim 14, wherein said bullet mounting ball contains ferromagnetic material, said retaining means comprising means for applying a magnetic force to said ball at a first magnitude sufficient to maintain thereof in frictional rigid engagement with said socket means with said bullet in said desired angular orientation while said support means is being rotated.

17. The apparatus as claimed in claim 16, wherein said ferromagnetic material contains ferromagnetic particles embedded in a non-ferromagnetic matrix.

18. The apparatus as claimed in claim 16, wherein said transverse reference plane and said longitudinal axis are substantially horizontal.

19. The apparatus as claimed in claim 18, wherein said magnetic force applying means can be operated to apply to said ball a magnetic force of a second magnitude lower than said first magnitude, said second magnitude being sufficient to maintain the bullet mounting ball in frictional engagement with said socket means while allowing positioning of said bullet in said desired orientation prior to said support rotation.

20. The apparatus as claimed in claim 19, wherein said magnetic force applying means is a magnetic field source aligned with said rotation axis and being mounted for displacement along said rotation axis between a proximal position and a distal position with respect to said bullet mounting ball, to produce said magnetic forces of said first and second magnitudes respectively.

21. The apparatus as claimed in claim 20, wherein said rotary support means is a generally cylindrical member having a proximal end portion connected to said socket means, and a distal end portion made of a ferromagnetic material, said magnetic field source being mounted with a housing and driving shaft assembly having means to prevent rotation of said driving shaft within said housing, said driving shaft being displaceable within said housing along said rotation axis and having a free end being rigidly connected to said magnetic field source, said magnetic field source being used as a clutching device for mechanically coupling the distal end portion of said cylindrical member with said driving shaft.

22. The apparatus as claimed in claim 21, wherein said fired bullet holding means further comprise motor means mounted on said frame and coupled to said housing, said motor means being controlled to impart rotation to said cylindrical member.

23. An apparatus as claimed in claim 11, wherein said apparatus further comprises a positioning table, said microscope focusing means is a first stage included in said table for supporting said bullet and cartridge holding means and being displaceable in a direction parallel to said optical axis within a basic reference plane parallel to said transverse reference plane.

24. An apparatus as claimed in claim 23, wherein said microscope focusing means further comprise linear actuator means to provide the displacement of said first stage, and means for detecting the focus of said imaged portion to control the linear actuator according to a detected focus.

25. The apparatus as claimed in claim 23, wherein said optical axis aligning means comprise a second stage included in said table and being displaceable in a direction normal to said optical axis and parallel to said basic reference plane and means for displacing said fired bullet holding means and said fired cartridge holding means relative to said frame in a direction normal to said basic reference plane.

26. The apparatus as claimed in claim 25, wherein said table further comprises linear actuator means to provide the displacement of said second stage.

27. The apparatus as claimed in claim 25, wherein said fired bullet holding means and said fired cartridge holding means are supported on said positioning table with a sliding support member provided with a channel extending parallel to said perpendicular axis, said displacing means comprising a guide rail mounted on said first stage and adapted to receive the channel to provide sliding connection for said support member, and means to adjust the position of said support member along said perpendicular axis.

28. The apparatus as claimed in claim 27, wherein said position adjusting means comprises a linear actuator assembly.

29. The apparatus as claimed in claim 28, wherein said linear actuator assembly includes a shaft having a first threaded end portion cooperating with a corresponding threaded hole extending through said support member and parallel to said perpendicular axis, and motor means coupled to a second end portion of said shaft to impart rotation to said shaft for adjusting the position of said support member along said perpendicular axis.

30. The apparatus as claimed in claim 11, wherein said fired cartridge holding means comprises first and second clamp members connected for receiving therebetween said fired cartridge and cooperating to maintain thereof substantially aligned with said longitudinal axis.

31. The apparatus as claimed in claim 11, wherein said apparatus further comprises image sensing means coupled to said microscope to produce electrical image signals representing said imaged surface area.

32. A method for mounting a fired bullet to be imaged, comprising steps of:

attaching said fired bullet to a an exposed surface area of a mounting ball;

providing a socket means for receiving and retaining said mounting ball at a portion thereof generally opposed to said surface area;

placing the bullet in a desired angular orientation with respect to an intersecting transverse reference plane defining a bullet section;

providing a microscope having an optical axis;

aligning the optical axis with the bullet section;

projecting light on a surface area of the bullet; and focusing the microscope to image said surface area.

33. The method as claimed in claim 32, further comprising step of:

rotating said fired bullet about a rotation axis substantially perpendicular to said transverse reference plane, said bullet section being intersected by said rotation axis, to scan said imaged bullet surface area.

* * * * *